Sept. 3, 1935.  E. H. BRIDENBAUGH  2,013,232
HYDRAULIC RELIEF VALVE
Filed April 28, 1934
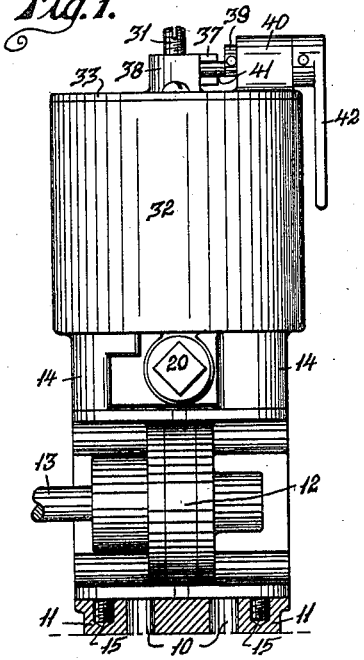
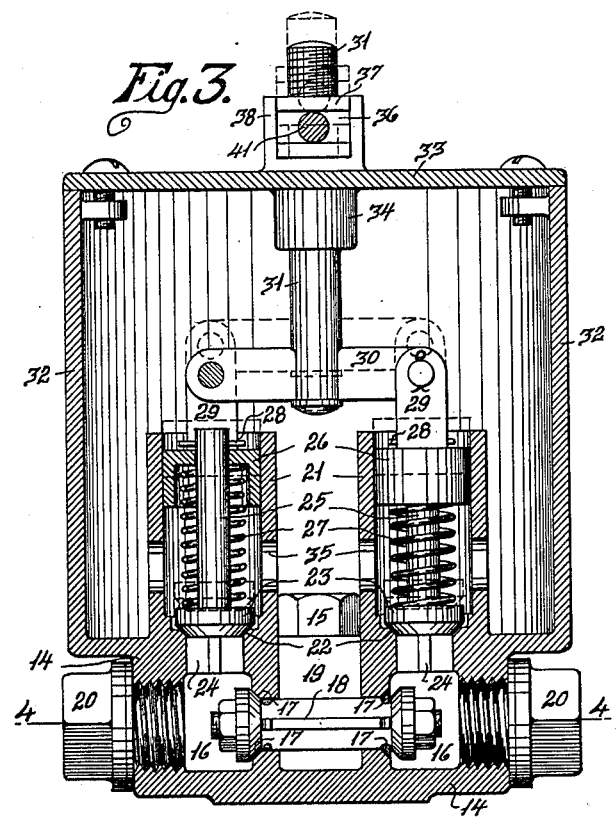
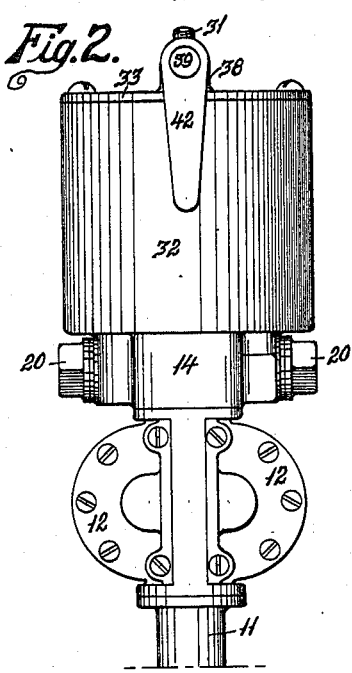
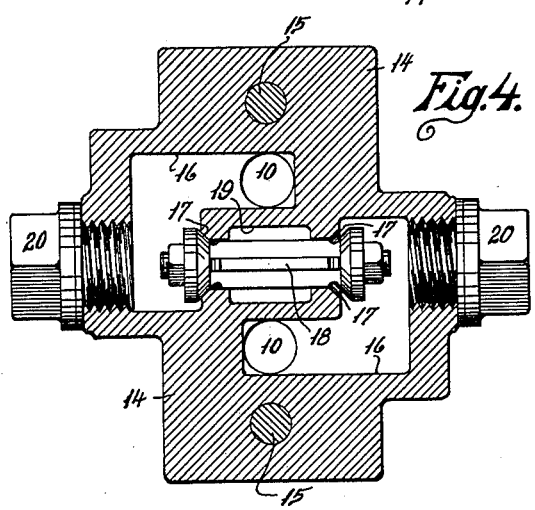
Inventor:
Elmer H. Bridenbaugh.
By W. B. King
Attorney.

Patented Sept. 3, 1935

2,013,232

UNITED STATES PATENT OFFICE 2,013,232

HYDRAULIC RELIEF VALVE

Elmer H. Bridenbaugh, Denver, Colo., assignor to May Moyers, Denver, Colo.

Application April 28, 1934, Serial No. 722,938

9 Claims. (Cl. 277—61)

This invention relates to relief and control means for hydraulic pressure systems, and has as an object to provide improved means operable to relieve such systems of excess pressures.

A further object of the invention is to provide improved valve means automatically operable to by-pass excess pressures developed within an hydraulic pressure system.

A further object of the invention is to provide improved pressure relief means automatically operable to by-pass excess pressures developed within an hydraulic pressure system irrespective of the direction of pressure flow in said system.

A further object of the invention is to provide improved pressure relief means automatically operable to by-pass excess pressures developed within an hydraulic pressure system and automatically adjustable to function in respect of pressures acting in either direction through said system.

A further object of the invention is to provide improved pressure relief means in by-passing relation with an hydraulic pressure system and manually operable to nullify pressure action through said system.

A further object of the invention is to provide improved pressure relief means automatically operable to by-pass excess pressures developed within an hydraulic pressure system and manually adjustable to nullify pressure action through said system.

A further object of the invention is to provide improved automatic pressure relief means for hydraulic pressure systems, which means are positive and efficient in operation, adjustable throughout a wide range of working pressures, readily adaptable to operative combination with infinite specific pressure system installations, relatively simple and inexpensive of manufacture and installation, and durable in use.

My invention consists in the construction, arrangement and combination of elements hereinafter set forth, pointed out in my claims and illustrated by the accompanying drawing, in which—

Figure 1 is an elevation of one embodiment of the invention assembled and mounted in operative combination with pump means forming part of a specific hydraulic pressure system. Figure 2 is an elevation of and at right angles with the showing of Figure 1. Figure 3 is a vertical section, on an enlarged scale, taken approximately axially of the pressure relief assembly illustrated in Figures 1 and 2. Figure 4 is a transverse section taken on the indicated line 4—4 of Figure 3.

In the construction of the improvement as shown, the numeral 10 designates pressure channels of an hydraulic pressure system, which channels may be, or communicate with, pipes, conduits, or the like, and are illustrated as bores formed in and opening upwardly in spaced, parallel relation through a block-like base element 11. The channels 10 may form branches of a by-pass communicating between pressure and return lines of a pressure system, in which case they would operatively connect directly with the pressure relief assembly as hereinafter described, but in the illustrative showing said channels operatively communicate with a pressure pump assembly 12, of common gear type, arranged to be operated through power applied to the rotation of a shaft 13 to draw fluid through one of said channels 10 for discharge under pressure through the other of said channels, either of said channels 10 being hence a pressure or return line according to the direction of pump rotation. All of the foregoing is conventional practice and is illustrated and described as a typical representation, only, of a pressure system to which the invention may be advantageously applied.

The pressure relief assembly includes a block-like base portion 14 adapted to seat on and be secured to a suitably fixed element through which the channels 10, or extensions thereof, communicate, said portion 14 being illustrated in Figures 1 and 2 on and in superposed relation with the pump assembly 12, bolts 15 engaging through said portion 14 and pump assembly 12 to threaded engagement with the element 11 serving to removably clamp the various elements and assemblies in the desired interrelation. Suitable chambers 16, in this instance L-shaped in plan, are formed in duplicate and in spaced relation within the base portion 14, each of said chambers communicating with one of the channels 10 through a hole formed through the base of the portion 14 in registering relation with the respective channel or with an extension of the latter through the housing of the pump assembly 12. Thus, when operative communication is effected between the chambers 16 a continuous passageway is provided between the pressure feed and return lines represented by the channels 10 in by-passing relation with the pump assembly 12, or similar pressure generating means. A straight, horizontal bore interconnects the chambers 16 within the portion 14, said bore being formed with a valve seat 17 at each of its junctions with a chamber 16, and a rigid, double-ended valve element 18, comprising a relatively long intermediate guide bar in fixed spacing relation between identical, opposed valve discs, is mounted through said bore, the guide bar of said element having a length such as to position the valve discs apart a distance in excess of the length of said bore between the seats 17 and being so mounted in said bore as to maintain said discs in axial alinement and cooperating relation with said seats, which arrangement permits either of said valve discs to close against its seat 17 under pressure applied through its respective chamber 16, the other of said discs, because of the length of the guide bar, being consequently held in open relation with its seat 17, direct communication between the chambers 16 being thus cut off when pressure is applied to either of said chambers. An open-top well 19 is formed in the portion 14 between the chambers 16 and is intersected by the bore connecting said chambers, so that, when one end of said bore is closed by the valve element 18, free communication is had through the other end of the said bore between a chamber 16 and the well 19. For convenience in installing and adjusting the valve element 18, the bore wherein said element is mounted is extended through outer walls of the portion 14, and the outer ends of said bore are normally closed by means of threaded plugs 20 removably engaging the intersected walls of the portion 14. Each of the chambers 16 is provided with an outlet opening upwardly through the portion 14 to communicate axially with an open-top valve housing 21 rising perpendicularly from said portion 14 and preferably formed integrally with the latter, said housings 21 being thus arranged in axial parallelism on opposite sides of the well 19. An upwardly-opening valve seat 22 is positioned at the junction of each housing bore with the outlet from the corresponding chamber 16 and a valve disc 23, preferably provided with guide means 24 slidingly engaging the chamber outlet, is positioned for axial reciprocation within each housing 21 and arranged for closing cooperation with its respective seat 22. Stems 25 rise axially of the housings 21 from the valve discs 23 to pass centrally through washers or cups 26 freely slidable within the housings 21, and expansive coil springs 27 are mounted about the stems 25 to act between the cups 26 and discs 23 to urge separation of said elements, a pin 28 engaging through each stem 25 above its cup 26 serving to limit the separation of elements possible through pressure of the springs 27. Arms 29 rise in fixed relation from upper surfaces of the cups 26 and upper, corresponding ends of said arms are pivotally interconnected by means of a link 30, thereby disposed transversely above the housings 21, and a threaded stem 31 rises in fixed relation perpendicularly from the central portion of the link 30. A suitable housing wall 32 rises from the base portion 14 in enclosing relation with the assembly of elements hereabove described to terminate in an open upper end above the link 30, which open end is provided with a removable closure member 33 formed with a suitably positioned, apertured boss 34 through which the stem 31 is slidingly received for extension of its free end above the closure member. It is obvious that various expedients may be employed to adjustably hold the stem 31 relative to the closure member 33 to the end of positioning the cups 26 within the housings 21 for desired pressure of the springs 27 against the valve discs 23, a fully operative device being presented so soon as some such means is provided. With the stem 31 held at its intersection with the member 33 against axial reciprocation and so positioned as to hold the valve discs 23 in closing relation with the chamber outlets under the influence of the springs 27, it is apparent that each chamber 16 to which pressure is applied through a channel 10 is sealed, through action of the check-valve assembly 18, against escape of such pressure therefrom so long as the pressure is less than that required to unseat a valve 23 against pressure of the spring 27. The pressure exerted by a spring 27 having been adjusted as desired through adjustment of the stem 31 relative to the member 33, any excess pressure acting within a chamber 16 will serve to unseat the corresponding valve 23 and permit pressure escape to the corresponding housing 21, and thence, through apertures 35 in said housing, to the housing 32, well 19, other chamber 16 and other channel 10, thus completing a by-pass between the pressure feed and return lines. So soon as the excess pressure is relieved, the opened valve 23 automatically closes and the pressure system may operate without functioning of the by-pass. Reversal of pressure flow in the system merely acts to shift the check-valve assembly 18, which is done automatically as soon as pressure is applied to either chamber 16, further functioning of the relief by-pass being exactly as above described irrespective of which channel 10 is used for pressure feed and which for return.

To provide means for holding the stem 31 in the desired adjustable relation with the closure member 33 an arrangement is shown which is also manually operable, when desired, to unseat the valves 23 and open the by-pass controlled thereby to nullify effect of the pressure system. To this end a nut 36 is mounted on and in threaded engagement with the upper end of the stem 31, said nut being formed with an angular, radial extension 37 provided with a transverse, laterally-opening notch and adapted to seat in a flange 38 rising from the member 33 and notched to receive the radial extension 37 so as to prevent the nut 36 from turning, the downward extension of the stem 31 within the housing 32 being thus limited by engagement of the nut 36 with its seat, while the assembly controlled by the stem 31 is free for upward travel relative to the closure member. A short shaft 39 is horizontally disposed radially of and in spaced relation with the stem 31 and is journaled for rotation in a bearing 40 carried by the closure member 33, said shaft being provided with an eccentrically located crank pin 41 extending in axial parallelism from its inner end to engage within the transverse notch of the nut extension 37 and having an operating lever 42 fixed to its outer end, so that, with the pin 41 in its lowermost position, the nut 36 is seated to hold the valves 23 in closing relation with the chamber outlets, as shown in full lines in the drawing, rotation of the lever 42 through a semi-circle acting through the eccentric pin 41 to lift the nut 36, stem 31 and attached elements to the position indicated by dotted lines in Figure 3, whereby unseating the valves 23 and opening the by-pass controlled thereby.

It is to be noted that the improved pressure relief means may be operatively connected in any hydraulic pressure system in by-passing relation between pressure feed and return lines at any point between the pressure generating and pressure responsive agencies of such system, and that said means may also be employed to add to or maintain the fluid supply of such a system, since the reservoir of the housing 32 is at all times in communication with the channel acting as return line of the system.

Since many changes, variations and modifications in the specific form, construction and arrangement of the elements shown and described may be had without departing from the spirit of the invention, I wish to be understood as being limited solely by the scope of the appended claims rather than by any details of the illustrative showing and foregoing description.

I claim as my invention:

1. The combination with pressure feed and return lines of a pressure circulating system, of a by-pass operatively interconnecting said feed and return lines, shiftable means automatically pressure-operable to obstruct said by-pass in either direction of pressure-flow therethrough and auxiliary means resiliently held in normal obstructing relation with said by-pass and pressure-responsive to open said by-pass for the relief of excess pressures therein.

2. The combination with pressure feed and return lines of a pressure circulating system, of a by-pass operatively interconnecting said feed and return lines, freely slidable means automatically pressure-operable to obstruct said by-pass in either direction of pressure-flow therethrough and auxiliary means resiliently held in normal obstructing relation with said by-pass on either side of said slidable means and pressure-responsive to open said by-pass for the relief of excess pressures therein.

3. In combination with pressure feed and return lines of a pressure circulating system, a by-pass operatively interconnecting said feed and return lines, a check-valve in said by-pass automatically operable by pressure in either branch of said by-pass to obstruct the pressure branch and open the other branch of said by-pass, and auxiliary means resiliently held in normal obstructing relation with said by-pass branches on either side of said check-valve and pressure-responsive to open said by-pass for the relief of excess pressures therein.

4. In combination with pressure feed and reture lines of a pressure circulating system, a by-pass operatively interconnecting said feed and return lines, a compound check-valve freely slidable in said by-pass and automatically responsive to pressure in either branch of said by-pass to obstruct the pressure branch and open access to the other branch thereof, a relief chamber above and communicating with said by-pass intermediate the obstructing elements of said check-valve, spaced outlets communicating between said relief chamber and each of said by-pass branches, and auxiliary valve means within said chamber resiliently held in normal obstructing relation with said outlets and individually pressure-responsive to open said by-pass for the relief of excess pressure therein.

5. In combination with pressure feed and return lines of a pressure circulating system, a by-pass operatively interconnecting said feed and return lines, a compound check-valve freely slidable in said by-pass and automatically responsive to pressure in either branch of said by-pass to obstruct the pressure branch and open access to the other branch thereof, a relief chamber above and communicating with said by-pass intermediate the obstructing elements of said check-valve, spaced outlets communicating between said relief chamber and each of said by-pass branches, valve guides rising within said chamber adjacent each of said outlets, valve elements positioned in said guides arranged for obstructing cooperation with said outlets, adjustably fixed elements in said guides in slidable relation with said valve elements, and resilient means engaging between said valve elements and adjustably fixed elements to urge said valve elements into normal obstructing relation with said outlets.

6. In combination with pressure feed and return lines of a pressure circulating system a base element operatively connected in by-pass relation between said pressure feed and return lines and formed with similar chambers each communicating with a by-pass branch, a reservoir surmounting said base and formed with a well portion positioned intermediate said chambers, a passageway communicating between said chambers and intersecting said well portion, a compound check-valve slidable in said passageway and automatically responsive to pressure in either chamber to obstruct outlet from said pressure chamber through said passageway and to open communication between said passageway and the other of said chambers, outlets communicating between said reservoir and each of said chambers and resiliently-yieldable valve elements in normal obstructing relation with said outlets and individually pressure-responsive to open said by-pass for the relief of excess pressure therein.

7. In pressure relief means, a reservoir formed with a well portion, a passageway intersecting said well portion and arranged for connection in by-passing relation between pressure feed and return lines of a pressure circulating system, a compound, freely slidable valve element in said passageway automatically pressure-operable to obstruct said passageway on either side of said well portion and to simultaneously open communication between said well portion and the non-pressure portion of said passageway, outlets communicating between said reservoir and passageway on each side of said valve element, pressure-responsive valve means within said reservoir resiliently held in normal obstructing relation with said outlets, adjustable valve-positioning means engaging between said latter valve means and through a fixed element of said reservoir, and eccentric means engaging said valve-positioning means and manually operable to vary or relieve the resilient pressure urging said valve elements into obstructing relation with said outlets.

8. In apparatus of the character described, a reservoir formed with a well portion, a passageway connectible in by-passing relation between feed and return lines of a pressure circulating system and intersecting said well portion, valve means automatically pressure-responsive to obstruct communication between said well portion and the pressure side of said passageway, outlets communicating between said reservoir and passageway on each side of said valve means, individually pressure-responsive valve means resiliently held in normal obstructing relation with said outlets, and manually-operable eccentric means operatively engaging said latter valve means to move the latter out of obstructing relation with said outlets.

9. Apparatus of the character described comprising, in operative combination, a reservoir formed with a well portion, a passageway in intersecting relation with said well portion and connectible in by-passing relation between feed and return lines of a pressure circulating system, shiftable valve means in said passageway directly pressure responsive in either direction to obstruct communication between said well portion and the pressure side of said passageway and to simultaneously open communication between said well portion and the other side of the passageway, outlets communicating between said reservoir and passageway on each side of said shiftable valve means, independently pressure-responsive valve means resiliently held in normal obstructing relation with said outlets and yieldable to excess pressure in either side of said passageway to open communication through said reservoir, well portion and other side of said passageway for by-passing relief of such excess pressure, positioning means operatively engaging between said resiliently-held valve means and eccentric means engaging said positioning means manually-operable to unseat said latter valve means and maintain the by-pass controlled thereby in open relation.

ELMER H. BRIDENBAUGH.